United States Patent
Frieden et al.

(10) Patent No.: US 9,251,157 B2
(45) Date of Patent: Feb. 2, 2016

(54) ENTERPRISE NODE RANK ENGINE

(75) Inventors: Kurt Frieden, Berkeley, CA (US); Mitch Rudominer, El Cerrito, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 12/899,427

(22) Filed: Oct. 6, 2010

(65) Prior Publication Data

US 2011/0087644 A1 Apr. 14, 2011

Related U.S. Application Data

(60) Provisional application No. 61/250,846, filed on Oct. 12, 2009.

(51) Int. Cl.
*G06F 17/30* (2006.01)

(52) U.S. Cl.
CPC .................. *G06F 17/30144* (2013.01)

(58) Field of Classification Search
USPC .................. 707/722–734, 748–755
See application file for complete search history.

(56) References Cited

U.S. PATENT DOCUMENTS

| 5,835,087 | A  | * | 11/1998 | Herz et al. .................. 715/810 |
| 6,285,999 | B1 |   | 9/2001  | Page |
| 6,629,097 | B1 | * | 9/2003  | Keith ................................ 1/1 |
| 7,577,650 | B2 | * | 8/2009  | Wen .................. G06F 17/30864 1/1 |
| 7,930,303 | B2 | * | 4/2011  | Liu .................. G06F 17/30864 707/748 |
| 8,694,514 | B2 |   | 4/2014  | Frieden et al. |
| 2005/0033742 | A1 | * | 2/2005 | Kamvar ............ G06F 17/30864 1/1 |
| 2005/0071251 | A1 |   | 3/2005 | Linden et al. |
| 2005/0108001 | A1 | * | 5/2005 | Aarskog ........................ 704/10 |
| 2005/0114661 | A1 | * | 5/2005 | Cheng ................. G06F 21/6218 713/167 |
| 2005/0216533 | A1 | * | 9/2005 | Berkhin ....................... 707/204 |
| 2005/0240580 | A1 |   | 10/2005 | Zamir et al. |
| 2006/0112392 | A1 | * | 5/2006 | Zhang ................. H04L 12/5885 718/102 |
| 2006/0200432 | A1 |   | 9/2006 | Flinn et al. |
| 2006/0200556 | A1 | * | 9/2006 | Brave et al. .................. 709/224 |
| 2006/0248076 | A1 | * | 11/2006 | Troy ................. G06F 17/30722 1/1 |
| 2007/0032992 | A1 |   | 2/2007 | Trowbridge et al. |
| 2007/0192306 | A1 | * | 8/2007 | Papakonstantinou G06F 17/30864 1/1 |
| 2007/0244884 | A1 | * | 10/2007 | Yang ................. G06F 17/30864 1/1 |
| 2008/0016052 | A1 | * | 1/2008 | Frieden ............................ 707/5 |
| 2008/0016072 | A1 | * | 1/2008 | Frieden et al. ................... 707/7 |
| 2008/0052274 | A1 |   | 2/2008 | Moore et al. |
| 2008/0312992 | A1 |   | 12/2008 | Hoshi et al. |
| 2009/0119261 | A1 | * | 5/2009 | Ismalon .......................... 707/3 |

(Continued)

OTHER PUBLICATIONS

Alex Penev "Search in Personal Spaces" 2005, The University of New South Wales School of Computer Science and Engineering.*

(Continued)

*Primary Examiner* — Polina Peach (74) *Attorney, Agent, or Firm* — Kilpatrick Townsend & Stockton LLP (57) ABSTRACT

Various methods and systems for calculating ranks of importance of nodes of an enterprise are described. A plurality of relations may be accessed, wherein each relation of the plurality of relations comprises an indication of two nodes of a plurality of nodes, and an indication of a relationship between the two nodes. A matrix may be created using the plurality of relations. The matrix may be processed using the Perron-Frobenius theorem. The plurality of nodes of the enterprise may be ranked according to importance, wherein each node is either a user or an item.

15 Claims, 7 Drawing Sheets

(56) References Cited

U.S. PATENT DOCUMENTS

| | | | |
|---|---|---|---|
| 2009/0132561 A1 | 5/2009 | Cormode et al. | |
| 2009/0234835 A1* | 9/2009 | Galvin | G06F 17/30864 1/1 |
| 2009/0271232 A1 | 10/2009 | Waguet et al. | |
| 2009/0313246 A1* | 12/2009 | Saito | G06F 17/30864 1/1 |
| 2010/0153124 A1 | 6/2010 | Dasari et al. | |
| 2010/0185579 A1* | 7/2010 | Hong | G06F 17/30873 706/52 |
| 2010/0223212 A1 | 9/2010 | Manolescu et al. | |
| 2010/0274815 A1* | 10/2010 | Vanasco | 707/798 |
| 2010/0280882 A1 | 11/2010 | Faith et al. | |
| 2011/0040717 A1* | 2/2011 | Rho et al. | 706/50 |
| 2011/0066619 A1 | 3/2011 | Perantatos et al. | |
| 2011/0087516 A1 | 4/2011 | Frieden et al. | |
| 2011/0087678 A1 | 4/2011 | Frieden et al. | |

OTHER PUBLICATIONS

Magdalini P. Eirinaki "New Approaches to Web Personalization", 2006, Athens University of Economics and Business, Dept. of Informatics, 2006.*

Antonino Gulli "On Two Web IR Boosting Tools: Clustering and Ranking", 2006, Universita degli Studi di Pisa, Dipartimento di Informatica.*

Brian Kulis, Arun C. Surendran, John C. Platt "Fast Low-Rank Semidefinite Programming for Embedding and Clustering", 2007, In Proc. 11th Intl. AISTATS Conference.*

Unnikrishna Pillai, Torsten Suel, and Seunghun Cha "The Perron-Frobenius Theorem Some of its applications" IEEE Signal Processing Magazine Mar. 2005.*

Alani, Harith; Dasmahapatra, Srinandan; O'Hara, Kieron and Shadbolt, Nigel (2003). Identifying communities of practice through ontology network analysis. IEEE Intelligent Systems, 18(2), pp. 18-25.*

W. Keith Edwards "Putting Computing in Context: An Infrastructure to Support Extensible Context-Enhanced Collaborative Applications", ACM Transactions on Computer-Human Interaction, vol. 12, No. 4, Dec. 2005, pp. 446-474.*

U.S. Appl. No. 12/899,395, filed Oct. 6, 2010, Final Office Action mailed Jan. 31, 2013, 21 pages.

U.S. Appl. No. 12/899,395, filed Oct. 6, 2010, Advisory Action mailed Apr. 29, 2013, 5 pages.

U.S. Appl. No. 12/899,406, filed Oct. 6, 2010, Final Office Action mailed Jan. 10, 2013, 10 pages.

U.S. Appl. No. 12/899,406, filed Oct. 6, 2010, Advisory Action mailed Mar. 20, 2013, 3 pages.

U.S. Appl. No. 12/899,406, filed Oct. 6, 2010, Non-Final Office Action mailed Jul. 5, 2013, 10 pages.

U.S. Appl. No. 12/899,395, filed Oct. 6, 2010, Office Action mailed Sep. 7, 2012, 18 pages.

U.S. Appl. No. 12/899,406, filed Oct. 6, 2010, Office Action mailed Jul. 2, 2012, 10 pages.

U.S. Appl. No. 12/899,406, Notice of Allowance mailed on Dec. 23, 2013, 8 pages.

U.S. Appl. No. 12/899,395, Non Final Office Action mailed on Aug. 28, 2014, 17 pages.

U.S. Appl. No. 12/899,395, Final Office Action mailed on Dec. 11, 2014, 20 pages.

* cited by examiner

ENTERPRISE NODE RANK ENGINE

CROSS-REFERENCES TO RELATED APPLICATIONS

This application is a non-provisional of U.S. Provisional Patent Application No. 61/250,846, filed Oct. 12, 2009 entitled "Rank Engine: A System For Calculating Static Ranks By Perron-Frobenius Analysis Of Enterprise Activity Graph," the entire disclosures of which are incorporated by reference for all purposes. Further, this application is related to U.S. patent application Ser. No. 12/899,395, filed Oct. 6, 2010, entitled "Methods and Systems for Collecting and Analyzing Enterprise Activities," and U.S. patent application Ser. No. 12/899,406, filed Oct. 6, 2010, entitled "Collaborative Filtering Engine," the entire disclosures of which are incorporated by reference for all purposes.

BACKGROUND OF THE INVENTION

When a person uses a search engine, she may be looking for specific topics, files, or persons, to name only a few examples. Whether she is searching the Internet, a hard drive, or an enterprise's network, many results may be provided to the person. While these results may be in some way related to the search terms provided by the person, the results may contain at least some obscure recommendations that are unlikely to be desired by the person. One possible way of providing more relevant results is by organizing or filtering the results according to a calculated level of importance of each result. Therefore, a result determined to have a higher importance level may be presented to the person ahead of a result that has a lower importance level.

BRIEF SUMMARY OF THE INVENTION

In some embodiments, a method of calculating ranks of importance of nodes of an enterprise is present. The method may include accessing, by a computer system; a plurality of relations, wherein: each relation of the plurality of relations comprises an indication of two nodes of a plurality of nodes, and an indication of a relationship between the two nodes; and each node is either a user or an item. The method may include creating a matrix using the plurality of relations. The method may include processing the matrix using the Perron-Frobenius theorem. The method may include ranking based on the processing of the matrix, the plurality of nodes according to importance.

The method may include creating a table of a plurality of identifiers of the nodes and ranks. The method may include pushing the ranking of the plurality of nodes according to importance to one or more search engines. The method may include ordering, by the computer system, a set of search results at least partially based on the ranks of the nodes of the enterprise. In some embodiments, ordering the set of search results at least partially based on the ranks of the nodes of the enterprise further comprises ordering the set of search results at least partially based on a similarity score computed for the nodes. The method may include creating the plurality of relations based on a plurality of events, wherein each event of the plurality of events comprises an indication of a source node, an indication of a target node, and an indication of an action performed by the source node on the target node. In some embodiments, the method may include gathering, by the computer system, the plurality of events from multiple applications of the enterprise.

In some embodiments, a computer program product stored on a computer-readable storage medium for calculating ranks of importance of nodes of an enterprise is present. The computer program product may comprise instructions for accessing a plurality of relations, wherein each relation of the plurality of relations comprises an indication of two nodes of a plurality of nodes, and an indication of a relationship between the two nodes. The computer program product may include instructions for creating a matrix using the plurality of relations. The computer program product may include instructions for processing the matrix of the relations. The computer program product may include instructions for ranking based on the processing of the matrix, the plurality of nodes according to importance, wherein each node of the plurality of nodes is either a user or an item.

In some embodiments, a method of calculating ranks of importance of nodes of an enterprise may be present. The method may include creating a plurality of relations based on a plurality of events, wherein each event of the plurality of events comprises an indication of a source node, an indication of a target node, and an indication of an action performed by the source node on the target node. The method may include accessing the plurality of relations, wherein each relation of the plurality of relations comprises an indication of two nodes, and an indication of a relationship between the two nodes. The method may include processing the plurality of the relations using the Perron-Frobenius theorem. The method may include ranking based on the processing of the relations, the plurality of nodes according to importance, wherein each node is either a user or an item. The method may include creating a table of the nodes and ranks.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

When providing a user of a computer system with search results or some other form of recommendation of objects that the user may wish to interact with, some of the results provided may be irrelevant to the user. While these results may conform to the search terms provided by the user, the results may be less relevant to the user than some other results. For example, while two files may contain the same string of text searched for, one of the files may represent a company's quarterly report while the other file is a secretary's timesheet. The former file may be determined to be more important, and therefore likely to be useful to the user. Therefore, it may be more likely that the user conducting the search is likely to be interested in the company's quarterly report rather than the timesheet.

A rank engine may be used to determine the relative importance of objects (a object may refer to a user or an item, such as a document, wikipage, spreadsheet, etc.) as compared with other objects. These rankings may be used to order and/or filter search results that are to be provided to the user. The rankings may also be used to order and/or filter recommendations of objects that may be provided to a user at a time other than when a search is performed. For example, if a user is interacting with a particular document, the user may automatically be provided with a listing of one or more other documents that are similar and ranked by importance.

In some situations, it may be possible to determine the relative importance of objects by evaluating various links (such as hyperlinks) that exist between objects. This may work well in the context of the Internet. On the Internet, websites and web pages are typically linked to other websites and web pages via hyperlinks. However, in the context of an enterprise (e.g., a business organization), objects residing on the enterprise's computer system may be linked to few, if any, other objects on the enterprise's computer system. For example, it may be rare that one document is linked to any other document on the enterprise's computer system.

However, in the context of an enterprise, it may be possible to track various events that occur involving objects. An object (such as a user) may interact with another object (such as a document) of the enterprise via the enterprise's computer system. For example, a user (the first object) may open a document (the second object). Some or all of such events may be logged and stored. An event may contain an action, a source object (an object that conducts the action), and a target object (the object that is the recipient of the action). Besides opening, many other forms of actions may exist, such as closing, printing, saving, editing, forwarding, adding a contact, deleting, etc. Events involving such actions may be gathered from one or more different software applications operated by the enterprise. Each event may be associated with two objects and an action. These objects and actions may be used to create a mathematical graph that represents various relations between objects. In such a mathematical graph, the objects may be represented by nodes. Therefore, a node within such a mathematical graph may correspond to an object, which may be an item or a user. The edges of the graph, which may be represented as lines connecting various nodes, may represent relationships between the nodes. Therefore, in the context of a mathematical graph, the objects are referred to as nodes, with the relationships referred to as edges. For simplicity, throughout the remainder of the application, objects outside the context of a mathematical graph will also be referred to as nodes.

These events may be processed to identify relations. While an event refers to a specific event that occurred at a finite point in time, such as "user123" opening "file456" at 3:24 PM, a relation defines a relationship that may change between nodes. For example, a relation may be that "user123" has opened "file456" twenty-seven times. If the user opens "file456" again, the relation may be modified to state that "user123" has opened "file456" twenty-eight times. Such relations may be present for some or all of the nodes present on an enterprise's computer system. To be clear, a node may be either a user, or an item, which is any type of node besides a user, such as a document, a file, a presentation, a wikipage, an email, a picture, etc. As those with skill in the art will recognize, many other forms of nodes may be possible. Because links, such as hyperlinks, may not be available between some or all nodes within an enterprise, the measure of importance of nodes may be determined by evaluating relations rather than links.

Such measurements of importance may be performed by a rank engine, implemented using either software, hardware, or firmware. The rank engine may evaluate various relations that have been created based on events that occurred involving pairs of nodes. These relations may be shaped into a form appropriate to be evaluated by the rank engine. This may involve some or all of the relations being used to create a (square) matrix. The matrix may then have the Perron-Frobenius theorem applied to it to find a fixed point representing the ranks of nodes associated with the relations in the matrix. The resulting measure of ranking may be used to order and/or filter a list of search results provided to a user, or order and/or filter a list of recommended nodes provided to the user.

Figure 1:
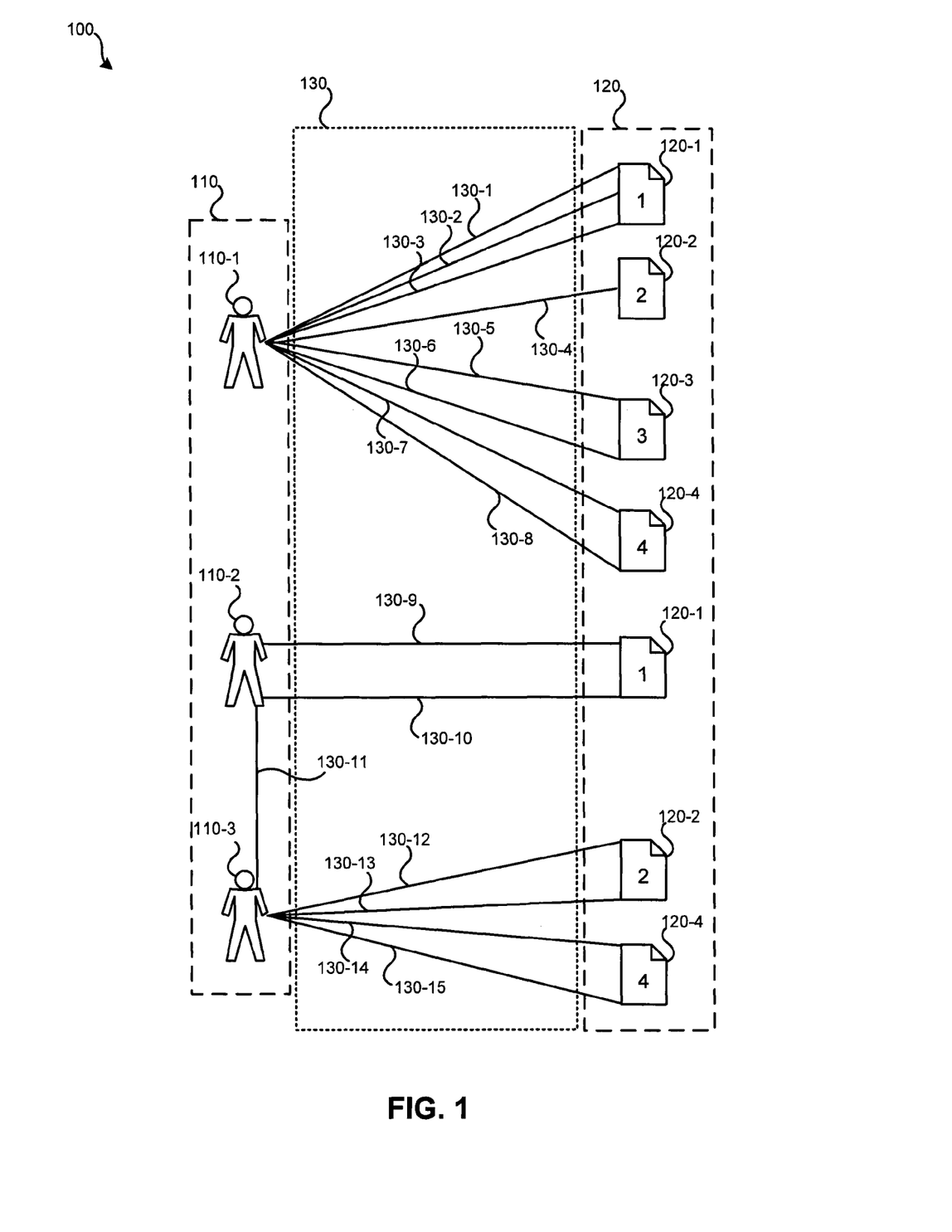
FIG. 1 illustrates a system that logs user interactions with nodes of an enterprise.

FIG. 1 illustrates a system 100 for organizing and maintaining nodes of an enterprise. This system may be represented in the form of a data structure diagram. Users 110 may interact with other users of users 110. Users 110 may also interact with items 120. Whether users 110 are interacting with other users of users 110 or an item of items 120, actions 130 may be logged and stored. An event may include two nodes and an action: a node performing an action, the action, and the node the action is being performed on. Therefore, each individual user may be involved in a number of events, such as user 110-1 of users 110 may be associated with a number of items (such as items 120-1, 120-2, 120-3, and 120-4) and associated actions (130-1, 130-2, 130-3). Further, the user may be associated with the various actions she performed involving these items. For item 120-1, the user may be associated with actions "Open" 130-1, "Print" 130-2, and "Edit" 130-3. As each event is performed, it may be stored for later reference.

System 100 of FIG. 1 may list some or all of the nodes, including the users, within an enterprise, and some or all of the actions and events involving such nodes of the system. Therefore, an enterprise's social network, representing some or all of the users within an enterprise may be a subset of all of the nodes within system 100.

Users 110 may represent all of the users that have an account with a computer system of an enterprise. System 100 illustrates three users for simplicity only; it should be understood that more (or fewer) users may be part of system 100. Each user (in system 100, user 110-1, user 110-2, and user 110-3) may be associated with one or more items (and/or other users) with which he has interacted. For example, user 110-1 is linked to items 120-1, 120-2, 120-3, and 120-4. Merely by way of example, item 120-1 may represent a document (such as a text document or a spreadsheet), item 120-2 may represent a wild (or an article within a wild), item 120-3 may represent a webpage, and item 120-4 may represent an email. As those with skill in the art will recognize, various other items are possible, and the examples of web pages, emails, documents, and wilds are only examples.

For each item that user 110-1 is associated with, the user 110-1 may also be associated with an action that involved user 110-1 and the associated item. Referring to item 120-1, user 110-1 may be associated with three actions that user 110-1 performed (or was otherwise involved in) regarding item 120-1. In this example, user 110-1 is associated with three actions: an open action (130-1), a print action (130-2) and an edit action (130-3). These actions and nodes may also be looked at in terms of events. As discussed, an event involves two nodes and an action. For example, an event may include user 110-1, item 120-1, and action 130-1. User 110-1, item 120-1 and action 130-2 may represent another event.

User 110-1 may have the same or different actions associated with other items. For example, referring to item 120-2, the user is associated with an upload action 130-4. Actions 130-5 and 130-6 may be associated with user 110-1 and object 120-3. Further, item 120-4 may be associated with user 110-1 and actions 130-7, 130-8. As another example, user 110-2 is also associated item 120-5. In the illustrated embodiment, user 110-2 is associated with user 110-3.

Referring to user 110-2, besides being associated with item 120-1 (which is illustrated twice for simplicity: once associated with user 110-1 and once associated with user 110-2), user 110-2 may be associated with user 120-3. Because both objects and users are nodes, whether an action involves a user and an item, two users, or two items, substantially the same relationship may be stored as an event: a source (the node performing the action), an action, and a target (the node the action is being performed on). Therefore, in one event, user 110-2 may be associated with user 110-3 and action 130-11, which may involve user 110-3 being added as a contact, or some other action.

It should be understood that only a small portion of the actions involving nodes may be illustrated in system 100. Besides actions such as open, print, edit, upload, copy, tag, add contact, many other actions may be possible, such as: delete, move, view, save, undelete, attach, delete contact, send email to (a user), receive email from (a user), like, rate, etc.

Figure 2:
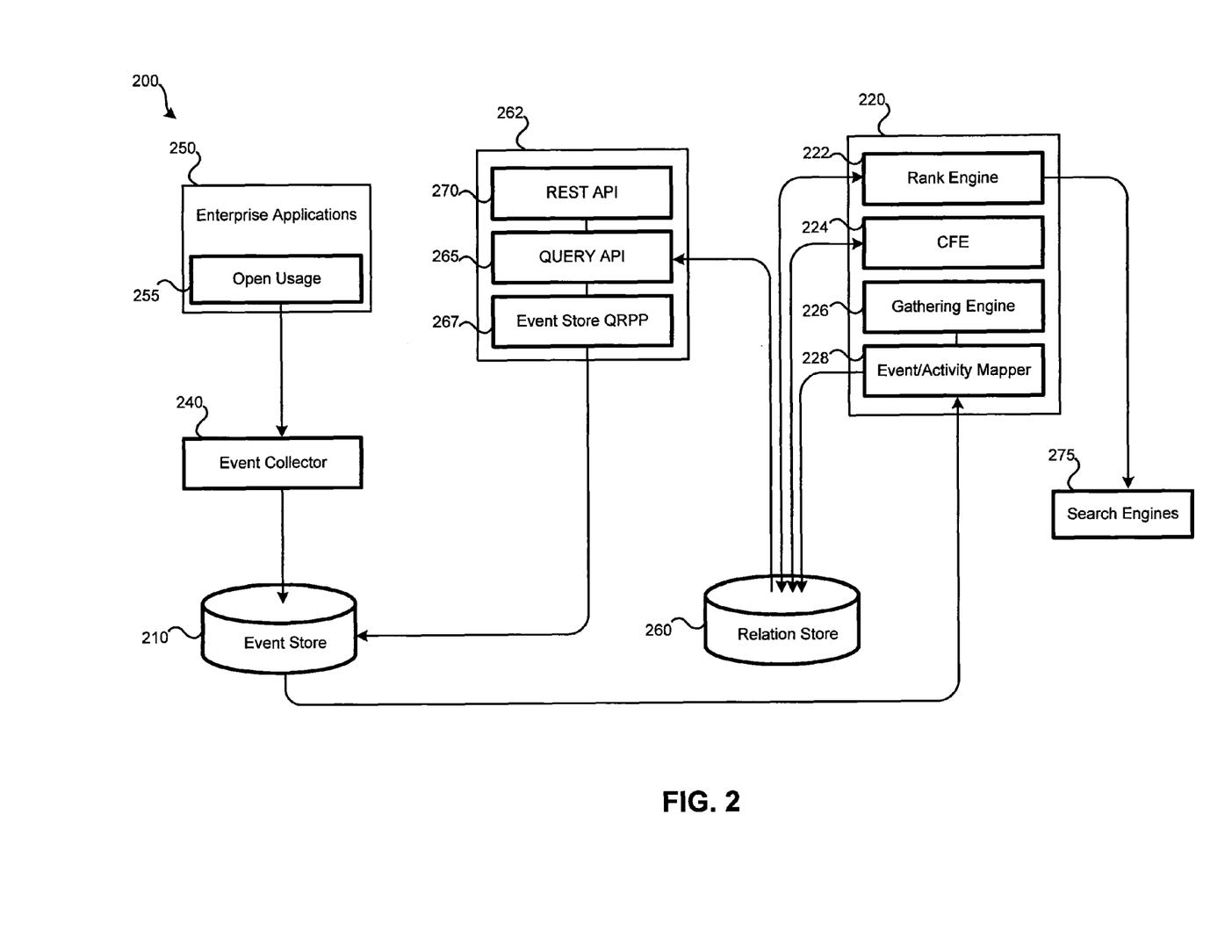
FIG. 2 illustrates a system that may log and store various associations between users, items, and actions.

To maintain system 100, the events involving users 110, items 120, and actions 130 may need to be logged and stored. Further, these events involving users 110, items 120, and actions 130 may be used to determine the similarity between pairs of users, pairs of items, and/or users and items. These functions may be performed by a system that utilizes computer systems and storage devices, such as system 200 of FIG. 2. FIG. 2 illustrates a system 200 that may store and analyze various associations between users, items, and actions.

System 200 may include an event store 210. Event store 210 may store actions that have occurred involving nodes in the form of events, using a computer-readable medium, such as memory or one or more hard drives. For example, if a user views a document at some time, event store 210 may store an identifier of the user (e.g., his user name), the time of the action, an identifier of a target item, and the type of action. Therefore, event store 210 may store a chronology (or otherwise organized, such as by source node, target node, or action type) of some or all of the actions performed using the computer system of an enterprise.

Event collector 240 may serve to collect or gather events as they occur (or in a batch processing arrangement that is performed periodically) from various enterprise applications 250, such as Open Usage API 255. Open Usage API 255 may serve to send or gather events for the event store. Event collector 240 may then store these events using event store 210. Event collector 240 and/or Open Usage API 255 may be configured to interact with a variety of different enterprise applications. For example, different steps may need to be performed and/or different files accessed in order to determine what emails a user has interacted with as opposed to what wikis a user has edited an article through.

Event store 210 may be accessed by engines 220. Engines 220 may include a rank engine 222, a Collaborative Filtering Engine (CFE) 224, a gathering engine 226, and an event/activity mapper 228. The gathering engine 226 and event/activity mapper 228 may access and process events stored in event store 210 and store the result of the processed events in relation store 260. Therefore, while event store 210 may contain unorganized or loosely organized events that have involved various nodes, gathering engine 226 and event/activity mapper 228 may serve to organize those events and determine the similarity of nodes based on those events. Relation store 260 may store various aggregations of events using a computer-readable storage medium, such as memory or one or more hard drives. For example, if there are ten actions in event store 210 indicating a user has opened a document, these may be combined and stored as a single relation between the document and the user that indicates the user has accessed the document ten times in relation store 260. Therefore, the relation store 260 may store data from the event store 210 organized into a format that uses multiple events to determine some or all of the relations.

The CFE 224 may represent an engine that determines the similarity between various objects and users. The results output by the CFE 224, such as the similarity scores determined between various nodes, may be stored in relation store 260 or in some other location to be used to recommend to a user some node that is similar to a node the user has interacted with. For example, the CFE 224 may recommend a similar document to a user based on actions that users have performed involving that document. The CFE 224 may also recommend some other user that has performed actions involving the same or similar nodes as the user. Various CFEs are described in detail in U.S. patent application Ser. No. 12/899,395, filed Oct. 6, 2010, entitled Collaborative Filtering Engine.

Nodes may be processed to determine a rank indicating the importance of each node compared to each other nodes. Such a ranking may be performed using software, firmware, and/or hardware. The ranking may be performed by rank engine 222 of FIG. 2, or by some other embodiment of a rank engine and may use relations stored in a relation store, such as relation store 260. These ranks may be stored in a search index and may be used to help determine an order in which to return search results. For example, the ranks may be used to list nodes that have been determined to be important higher in a listing of search results than nodes that are deemed to be less important.

Search engines 275 may be used to interact with engines 220, including rank engine 222 and CFE 224. Therefore, similarity values computed by CFE 224 may be accessed and used by search engines 275.

Query Service 262 may comprise one or more software modules. Query API (Application Programming Interface 265) receives queries for relation data from other applications. A user may submit a search or some other request through Query API 265. The Query API 265 queries the gathered relation data (possibly stored in relation store 260) and provides relation data to the requesting applications. This may also involve the use of rank engine 222 and CFE 224. REST API (Representational State Transfer Application Programming Interface) 270 may be used in conjunction with Query API 265 to interact with and receive information content from a website. The REST API 270 may establish a relationship with various gateways using authentication techniques. REST API 270 may also ensure that JAVASCRIPT hijacking does not occur by ensuring that REST responses are not valid JAVASCRIPT. String parsing may be used to convert text into valid JAVASCRIPT. Event Store QRPP (Query Result Post-Processor) 267 may perform security filtering and metadata provisioning at query time. Therefore, after a preliminary list of results has been determined, the Event Store QRPP 267 may remove nodes from the list of the results that a user is not permitted to see. Also, the Event Store QRPP 267 may add information to the list of results that will be presented to the user, such as a name, URL, description, icon IRL, etc. for each node on the list of results that will be presented to the user. Multiple different QRPPs may be present.

Additional detail regarding system 200 and various embodiments of methods utilizing a system, such as system 200 may be found in U.S. patent application Ser. No. 12/899,395, filed Oct. 6, 2010, entitled "Methods and Systems for Collecting and Analyzing Enterprise Activities,".

Figure 3:
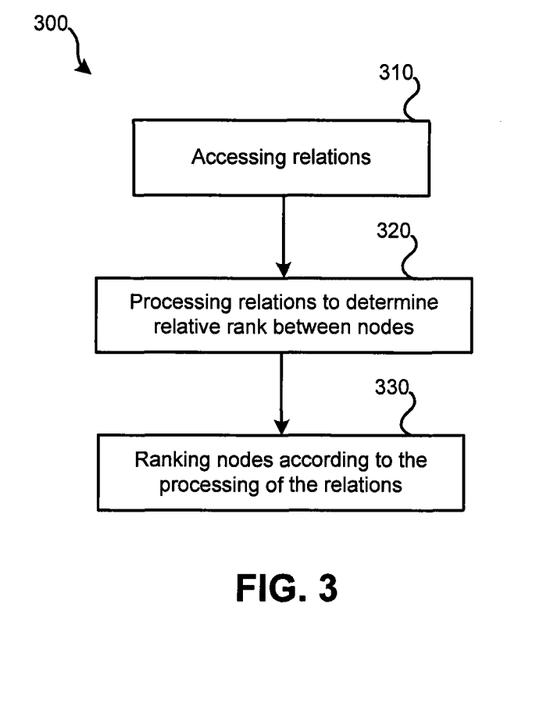
FIG. 3 illustrates a simplified embodiment of a method for ranking the nodes of an enterprise.

System 200 may be used to rank nodes of an enterprise based on relations involving the nodes. FIG. 3 illustrates a simplified embodiment of a method 300 for ranking nodes of an enterprise. Such a method may be conducted by a rank engine, such as rank engine 222 of FIG. 2. In some embodiments, a rank engine or some other software, hardware and/or firmware other than rank engine 222 of FIG. 2 may be used to conduct method 300.

At block 310, relations may be accessed by the rank engine. These relations may have been created and stored by some other engine. For example, a product, such as ORACLE's ACTIVITY GRAPH, may gather and/or collect events from one or more different applications. Applications may send an indication of events that have occurred to an event collector (such as event collector 240 of FIG. 2). Some applications may instead store events to a computer-readable storage device. If this occurs, an engine may periodically retrieve a listing of the events that have occurred involving that application. Whether the events are sent by the applications or gathered from the applications, the events may be stored using an event store and processed by some other engine, such as a gathering engine, to create relations. These relations may be stored in a relation store, such as relation store 260 of FIG. 2. These relations may be updated periodically, such as once per hour or once per day. These relations may be used to determine a rank of importance of some or all of the nodes represented in the relations. The relations stored on the relation store may be accessed by the rank engine to determine the rank of some (such as a particular class, such as items or users) or all the nodes associated with the stored relations. In some embodiments, the relation store may be in the form of a database table linked to the event store. Such a database table may be dynamically updated as events are added to the event store.

At block 320, these relations may be processed to determine the relative rank between nodes. This processing may make use of some algorithm or theorem to determine the relative importance of the nodes based on the relations. One possible theorem that may be used is the Perron-Frobenius theorem.

At block 330, based upon the output from the algorithm or theorem used, the nodes may be ranked. This rank may be used to identify the relative importance between nodes.

Figure 4:
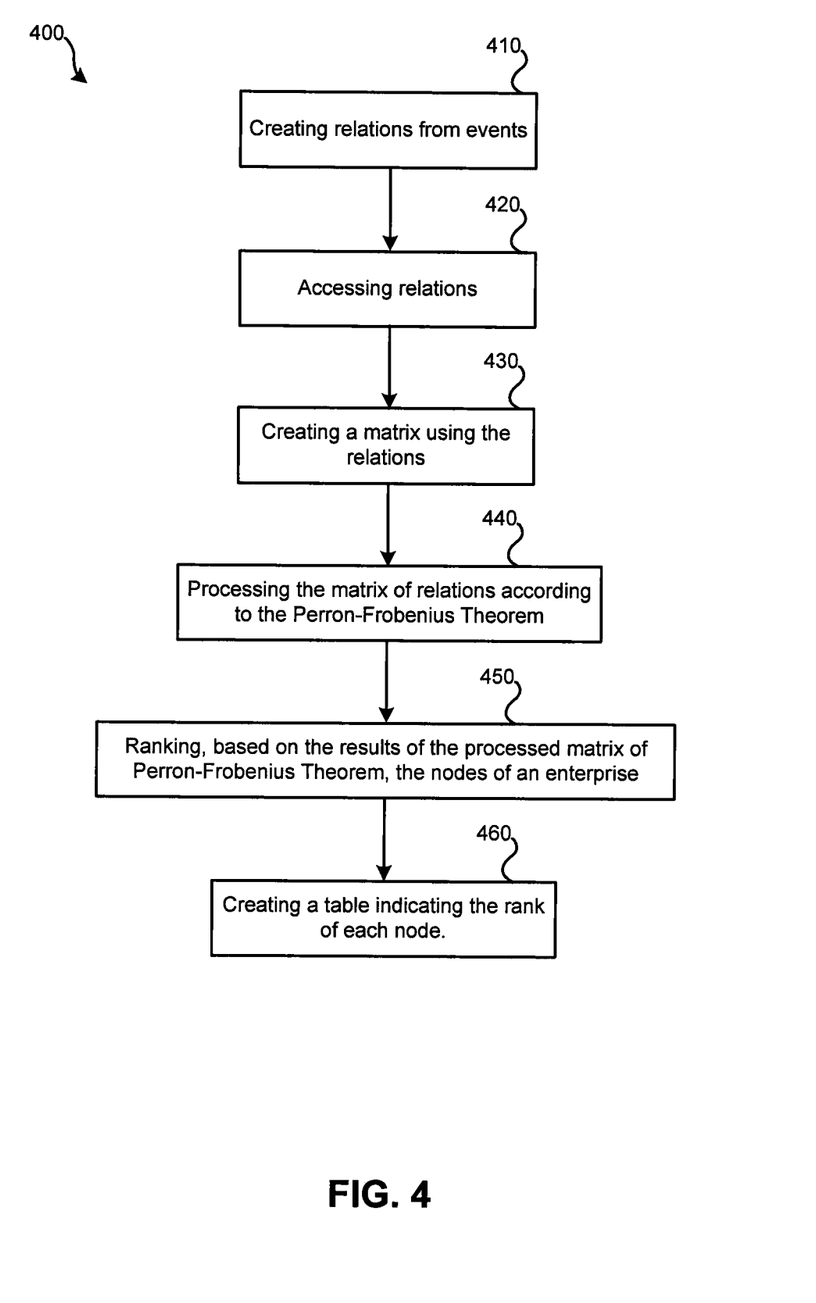
FIG. 4 illustrates another simplified embodiment of a method for ranking the nodes of an enterprise.

FIG. 4 illustrates another simplified embodiment of a method 400 for ranking nodes of an enterprise. Method 400 may represent the same method as method 300 of FIG. 3, or may represent some other method for ranking nodes of an enterprise. Further, method 400 may be performed using, generally, system 200 and, more specifically, rank engine 222 of FIG. 2 or may use some other computer system.

At block 410, events may be used to create and/or modify relations. If relations have yet to be created or a full rebuild of the relations is required, all relations may be created based on the events present in the event store. If the relations are to be modified, the relations may be updated based on events that have been added to the event store since the last time the relations were modified. The creation and modification of the relations may be handled by another piece of software, hardware, or firmware, such as ORACLE's ACTIVITY GRAPH product.

At block 420, a rank engine, implemented using software, hardware, and/or firmware, may access the relations, which are possibly stored on a relation store.

For the relations to be processed, the relations may need to be in a particular format. One possible format that may be required is a matrix, such as a square matrix. At block 430, the relations accessed at block 420 may be reshaped, meaning arranged in a particular format to create a matrix. The matrix that is created may be a square matrix, meaning it has the same number of rows as columns.

At block 440, the matrix may be processed according to the Perron-Frobenius theorem. The Perron-Frobenius theorem may be used to assist in determining the relative importance of nodes by multiplying the matrix repeatedly by an arbitrary starting vector to calculate a measure of rank. A value may be output for each node.

At block 450, the node of the enterprise may be ranked according to the results of the matrix processed in accordance with the Perron-Frobenius theorem. At block 460, a table may be created that indicates a measure of rank of each node. This table may include two columns: one indicating an identifier of a node and one indicating an associated measure of rank of the nodes. This table may be accessed to determine the importance of nodes as compared with each other.

Figure 5:
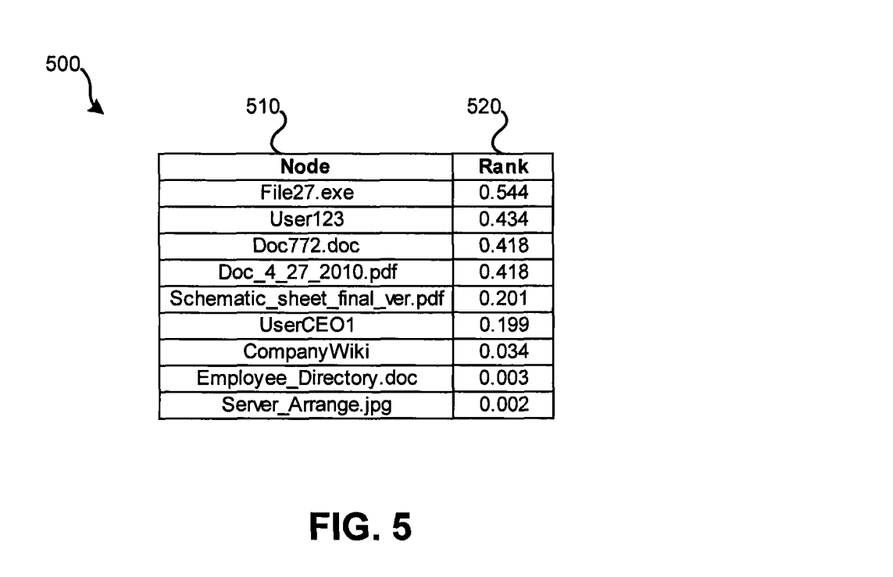
FIG. 5 illustrates an embodiment of a table used to store the ranking of nodes.

FIG. 5 illustrates an exemplary embodiment of a table 500 used to store the measured ranking of nodes. Column 510 may store an identifier of each node that is measured. These identifiers may be in the form of a variety of different indicators, such as a unique string of characters or a serial number, used to identify one node from among the other nodes. Column 520 may be used to list the ranking of each node. The ranking of each node may be in the form of a floating point number between zero and one. It may be possible for multiple nodes to have the same measure of rank. While some embodiments of table 500 may be organized according to such measures of rank, other embodiments may be organized according to the identifier of the node. Further, it should be understood that other information may also be stored in table 500. For example, table 500 may be integrated with a search index such that when a user searches for a node, table 500 is used, at least in part, to order the search results. The ordering of the search results may also be based on how well the search results match the query string (which may be the name or identifier of a node) searched for by the user. Therefore, the ordering of the search results may be based on query-dependent and query-independent scores. Table 500 may be updated each time the rank engine is run.

Figure 6:
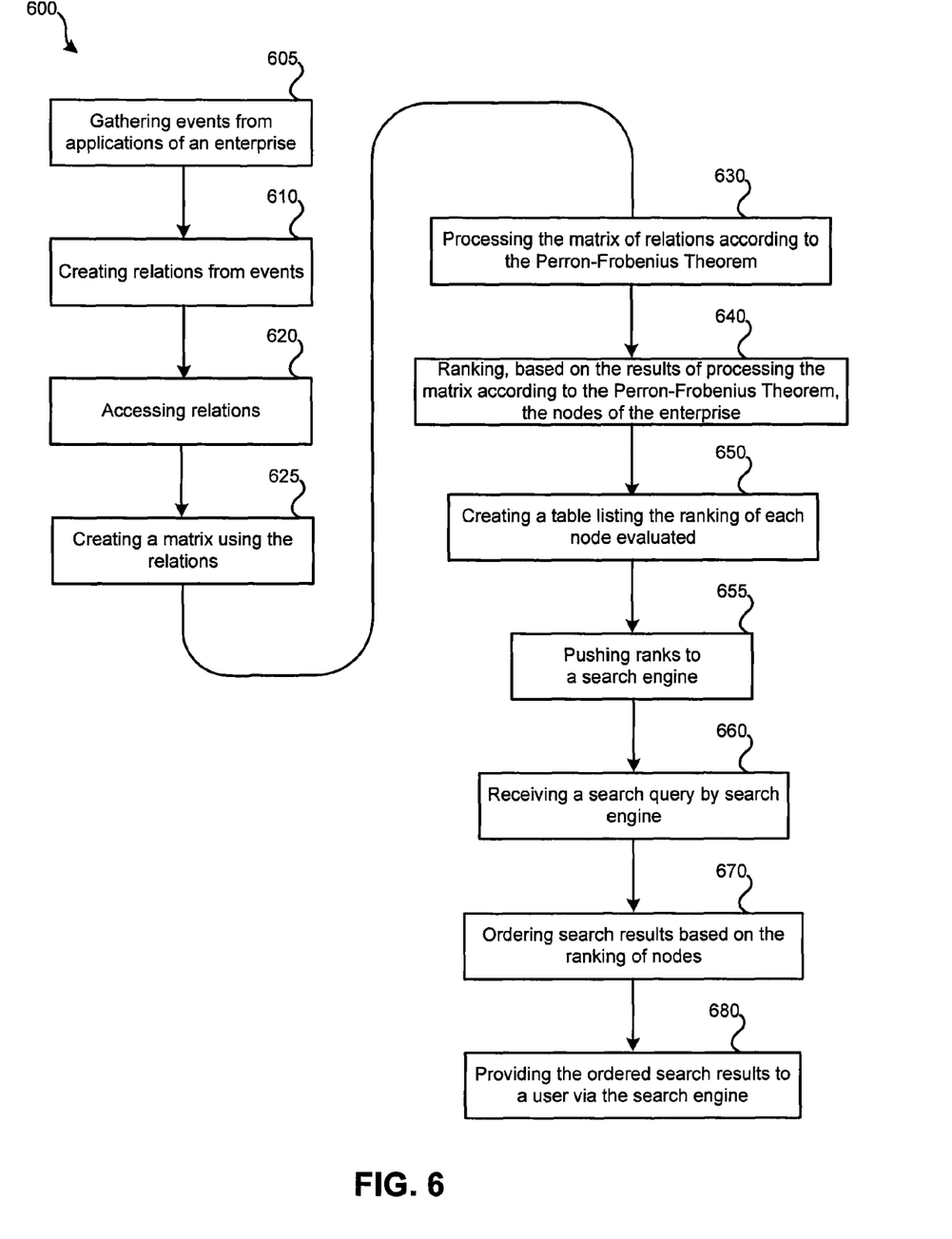
FIG. 6 illustrates another simplified embodiment of a method for ranking the nodes of an enterprise.

FIG. 6 illustrates another simplified embodiment of a method 600 for ranking nodes of an enterprise. Method 600 may represent the same method as method 300 of FIG. 3 and/or method 400 of FIG. 4, or may represent some other method for ranking nodes of an enterprise. Further, method 600 may be performed using, generally, system 200 and, more specifically, rank engine 222 of FIG. 2 or may use some other computer system.

At block 605, events may be gathered from applications of an enterprise. This may involve receiving events transmitted by one or more applications and/or retrieving events from one or more applications. As events occur, an application may send events to an event collector, such as event collector 240 of FIG. 2. Such an application may be programmed to communicate with an event collector via an API, such as Open Usage API 255. After an event occurs, an application may transmit an indication of the event to an event collector via Open Usage (or some other) API. Upon receiving the event, the event collector may store the event in an event store, such as event store 210.

If events are to be retrieved from one or more applications, an engine may periodically access a store where an application stores events that have occurred. The engine may retrieve all events that have occurred since the last retrieval of events. These events may also be stored in the event store. At block 610, relations may be created and/or modified based on the events. An engine, such as gathering engine 226 and/or event/activity mapper 228 of FIG. 2, or some other gathering engine and/or event/activity mapper may be used to create relations from the events stored in the event store. Such relations may be stored in a relation store, such as relation store 260. More detail is provided regarding system 200, the gathering of events, and the creation and modification of relations in related U.S. patent application Ser. No. 12/899,395, filed Oct. 6, 2010, entitled "Methods and Systems for Collecting and Analyzing Enterprise Activities,".

At block 620, some or all of the relations stored, possibly on a relation store, may be accessed by a rank engine, such as rank engine 222 of FIG. 2. The decision of what relations to access may be determined based on what class or classes of nodes are to be ranked. For example, a user may specify that only users or only items are to be ranked. Further, separate ranking may be produced for the class of users and the class of items. Further, it may be possible to rank various subclasses, such as specific types of items (e.g., only wikipages or only presentations) or specific groups of users (e.g., only employees in a particular city or only software developers).

Whether some or all of the stored relations are to be used to rank nodes, at block 625 a matrix may be created using the relations related to the nodes to be ranked. This may be referred to as reshaping. This may not involve editing the relations, but rather rearranging them to form a matrix, possibly a square matrix. The form of the matrix may be determined based on the algorithm used to determine the importance of the nodes.

At block 630, the matrix may be processed. This processing may involve applying the Perron-Frobenius theorem. According to the Perron-Frobenius theorem, a solution to a matrix of equations may be found by multiplying the matrix repeatedly by an arbitrary starting vector, as long as the matrix's entries are positive and the entries in each column add to one. The output of the application of the Perron-Frobenius theorem may result in some value being associated with each node. These values may be used at block 640 to measure the importance of the nodes in according to these values output by the Perron-Frobenius theorem. This may involve linking an identifier, such as an integer or some other number, with each node that indicates a measure of importance of the node. At block 650, a table may be created (or updated, if the table already exists). This table may be similar to table 500 of FIG. 5.

At block 655, the information contained in the table may be pushed to a search engine such that the information may be used to determine how to present search results to a user.

At block 660, a search request may be received from a user by the search engine. The user may generate a search request using some other application available through the computer system of the enterprise. At block 670, the rankings may be used to filter and/or order the search results based on the ranking of the nodes. The ordering of the search results may be partially based on a query-dependent score that identifies how much the search query received by the search engine matches the nodes in the search results and partially based on a query-independent score, such as the rankings of the nodes. The weight provided to the query-independent and query-dependent scores may be varied. The search results may be determined by some other engine besides the rank engine, such as a CFE (such as CFE 224 of FIG. 2). Various embodiments of CFEs are described in detail in related U.S. patent application Ser. No. 12/899,395, filed Oct. 6, 2010, entitled "Collaborative Filtering Engine,". Filtering of search results may involve removing one or more results from the search results based on the rank of the node of the search result being below some threshold. In some embodiments, the results may be reordered based on the ranks of the nodes of the search results. At block 680, the ordered search results may be provided to the user by the search engine.

It should be understood that besides ordering search results, the rankings may be used to order recommendations that are presented to a user. For example, if a user is working with a particular node (be it another user or an item), other similar nodes may be recommended to the user. These recommended nodes may also be filtered and/or ordered at least partly based on the rankings determined by the rank engine.

Figure 7:
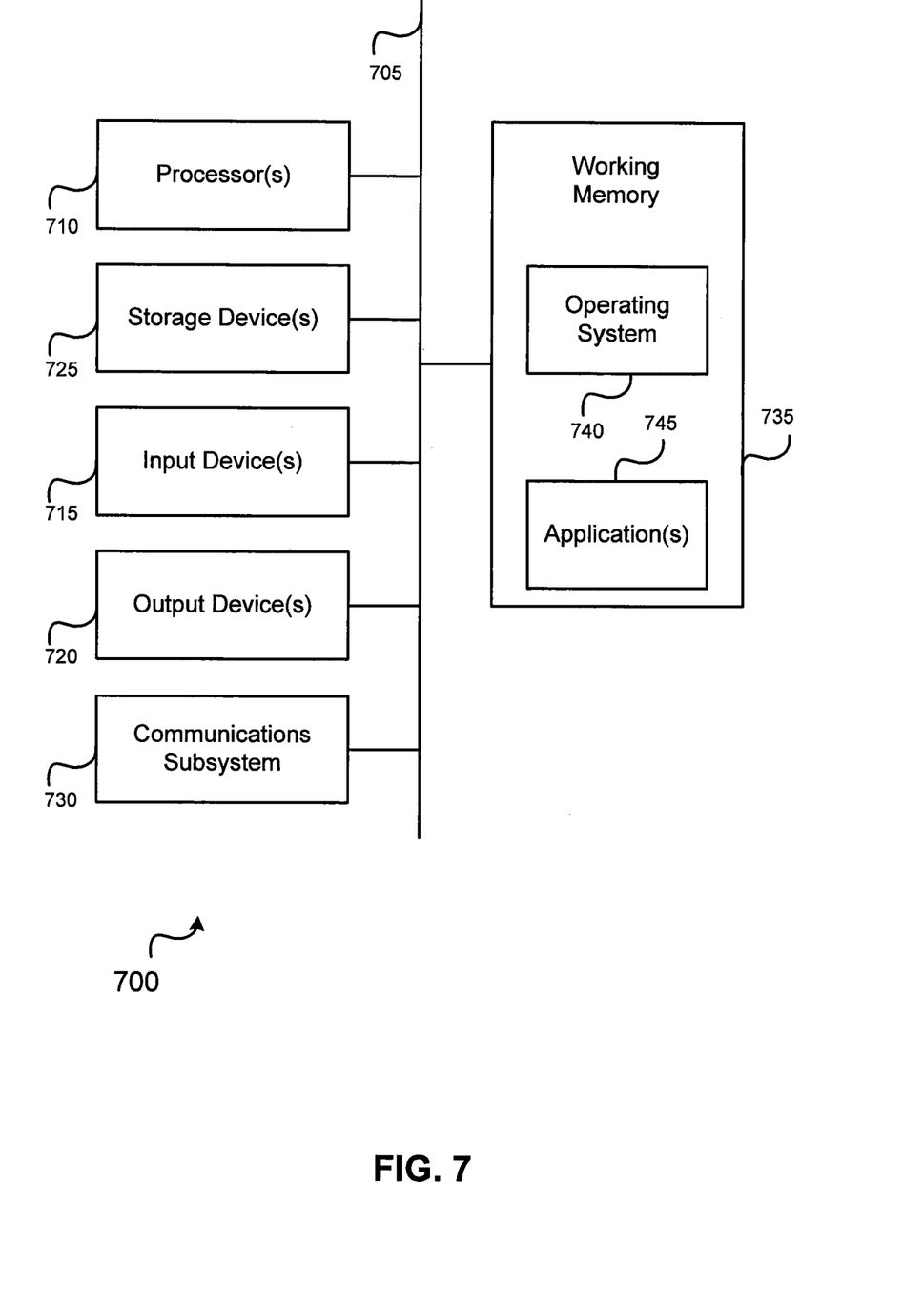
FIG. 7 illustrates a simplified embodiment of a computer system.

To perform the previously described methods, a computer system may be used. Such a computer system may be part of system 200 of FIG. 2. Alternatively, a different system involving a computer system may be used to perform the methods and processes described herein. FIG. 7 provides a schematic illustration of one embodiment of a computer system 700. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details.

For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, while the above description is in the context of recommending nodes within the context of an enterprise, it should be understood that similar arrangements may utilize actions to make recommendations outside of a single enterprise or business organization.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of calculating ranks of importance of nodes of an enterprise, the method comprising:
    tracking, by a computer system of the enterprise, a plurality of events from multiple applications of the enterprise, wherein each node of the enterprise comprise a user of the computer system or a business object of the enterprise and wherein each event of the plurality of events comprises an indication of a source node, an indication of a target node, and an indication of an action performed by the source node on the target node;
    storing, by the computer system, the plurality of events including the indication of the source node, the indication of the target node, and the indication of the action performed by the source node on the target node;
    creating, by the computer system, a mathematical graph based on the stored plurality of events, the mathematical graph comprising a plurality of nodes and edges, each node of the graph representing a target node or a source node from the stored plurality of events and each edge of the graph representing a relationship between the nodes based on an action from the stored plurality of events;
    creating, by the computer system, a matrix based on the mathematical graph and using the plurality of relations represented by the edges of the graph;
    processing, by the computer system, the matrix using the plurality of relations and the Perron-Frobenius theorem;
    determining, by the computer system and using the Perron-Frobenius theorem, a relative importance of each of the plurality of nodes by multiplying the matrix repeatedly by an arbitrary starting vector to calculate a measure of rank for each of the plurality of nodes;
    outputting the measure of rank for each of the plurality of nodes;
    using the measure of rank for each of the plurality of nodes, by the computer system and based on the processing of the matrix, to rank the plurality of nodes according to each of the plurality of nodes' relative importance;
    creating, by the computer system, a table comprising a column storing a unique identifier for each node and a column storing the measure of rank for each node and wherein the table is organized according to the stored measure of rank;
    integrating the table with a search index and updating the table after the ranking is performed based on the nodes' relative importance by linking the unique identifier with the each nodes that indicates the importance of the node;
    detecting an interaction by a user with a business object represented by a first node of the plurality of nodes, the detected interaction comprising opening, closing, printing, saving, editing, forwarding, or deleting, the business object represented by the first node; and
    in response to detecting the interaction by the user with the business object represented by the first node of the plurality of nodes, recommending to the user during the detected interaction at least one second node of the plurality of nodes based on the measure of rank stored in the table.

2. The method of claim 1, further comprising, pushing, by the computer system, the ranking of the plurality of nodes according to importance to one or more search engines.

3. The method of claim 1, further comprising ordering, by the computer system, a set of recommendations at least partially based on the ranks of the nodes of the enterprise, wherein the at least one second node comprises the ordered set of recommendations.

4. The method of claim 3, wherein ordering the set of recommendations at least partially based on the ranks of the nodes of the enterprise further comprises ordering the set of recommendations at least partially based on a similarity score computed for the nodes.

5. A non-transitory computer-readable storage medium for calculating ranks of importance of nodes of an enterprise, having sets of instructions stored thereon which, when executed by a computer, cause the computer to:
    track a plurality of events from multiple applications of the enterprise, wherein each node of the enterprise comprise a user of the computer system or a business object of the enterprise and wherein each event of the plurality of events comprises an indication of a source node, an indication of a target node, and an indication of an action performed by the source node on the target node;
    store the plurality of events including the indication of the source node, the indication of the target node, and the indication of the action performed by the source node on the target node;
    create a mathematical graph based on the stored plurality of events, the mathematical graph comprising a plurality of nodes and edges, each node of the graph representing a target node or a source node from the stored plurality of events and each edge of the graph representing a relationship between the nodes based on an action from the stored plurality of events;
    create a matrix based on the mathematical graph and using the plurality of relations represented by the edges of the graph;

process the matrix of the relations;

determine, using the Perron-Frobenius theorem, a relative importance of each of the plurality of nodes by multiplying the matrix repeatedly by an arbitrary starting vector to calculate a measure of rank for each of the plurality of nodes;

output the measure of rank for each of the plurality of nodes;

use the measure of rank for each of the plurality of nodes and based on the processing of the matrix to rank the plurality of nodes according to importance;

create a table comprising a column storing a unique identifier for each node and a column storing the measure of rank for each node and wherein the table is organized according to the stored measure of rank;

integrating the table with a search index and updating the table after the ranking is performed based on the nodes' relative importance by linking the unique identifier with the each nodes that indicates the importance of the node;

detect an interaction by a user with a business object represented by a first node of the plurality of nodes, the detected interaction comprising opening, closing, printing, saving, editing, forwarding, or deleting, the business object represented by the first node; and in response to detecting the interaction by the user with the business object represented by the first node of the plurality of nodes, recommend to the user during the detected interaction a second node of the plurality of nodes based on the measure of rank stored in the table.

6. The non-transitory computer-readable medium of claim 5, wherein the sets of instructions when further executed by the computer, cause the computer to push the ranking of the plurality of nodes according to importance to one or more search engines.

7. The non-transitory computer-readable medium of claim 5, wherein the sets of instructions when further executed by the computer, cause the computer to order a set of search results at least partially based on the ranks of the nodes of the enterprise.

8. The non-transitory computer-readable medium of claim 7, wherein ordering the set of search results at least partially based on the ranks of the nodes of the enterprise further comprises ordering the set of search results using a similarity score computed between the nodes.

9. A system for calculating ranks of importance of nodes of an enterprise, the system comprising:

a memory device; and a computer processor in communication with the storage device, wherein the storage device includes sets of instructions which, when executed by the computer processor, cause the computer processor to:

track a plurality of events from multiple applications of the enterprise, wherein each node of the enterprise comprise a user of the computer system or a business object of the enterprise and wherein each event of the plurality of events comprises an indication of a source node, an indication of a target node, and an indication of an action performed by the source node on the target node;

store the plurality of events including the indication of the source node, the indication of the target node, and the indication of the action performed by the source node on the target node;

create a mathematical graph based on the stored plurality of events, the mathematical graph comprising a plurality of nodes and edges, each node of the graph representing a target node or a source node from the stored plurality of events and each edge of the graph representing a relationship between the nodes based on an action from the stored plurality of events;

create a matrix based on the mathematical graph and using the plurality of relations represented by the edges of the graph;

process the matrix of the relations;

determine, using the Perron-Frobenius theorem, a relative importance of each of the plurality of nodes by multiplying the matrix repeatedly by an arbitrary starting vector to calculate a measure of rank for each of the plurality of nodes;

output the measure of rank for each of the plurality of nodes;

use the measure of rank for each of the plurality of nodes and based on the processing of the matrix to rank the plurality of nodes according to importance;

create a table comprising a column storing a unique identifier for each node and a column storing the measure of rank for each node and wherein the table is organized according to the stored measure of rank;

integrating the table with a search index and updating the table after the ranking is performed based on the nodes' relative importance by linking the unique identifier with the each nodes that indicates the importance of the node;

detect an interaction by a user with a business object represented by a first node of the plurality of nodes, the detected interaction comprising opening, closing, printing, saving, editing, forwarding, or deleting, the business object represented by the first node; and in response to detecting the interaction by the user with the business object represented by the first node of the plurality of nodes, recommend to the user during the detected interaction a second node of the plurality of nodes based on the measure of rank stored in the table.

10. The system of claim 9, wherein the enterprise is a business organization.

11. The system of claim 9, wherein the sets of instruction when further executed by the computer processor, cause the computer processor to order a set of search results at least partially based on the ranks of the nodes of the enterprise, wherein the set of search results comprises nodes.

12. The system of claim 9, wherein the sets of instruction when further executed by the computer processor, cause the computer processor to order the plurality of events from multiple applications of an enterprise.

13. The system of claim 11, wherein the sets of instruction when further executed by the computer processor, cause the computer processor to order a query request, wherein the query request specifies a search string and the set of search results is at least partially based on the search string.

14. The system of claim 13, wherein the query request is received via a search engine.

15. The system of claim 14, wherein the sets of instruction when further executed by the computer processor, cause the computer processor to order the set of search results at least partially ordered based on the ranks of the nodes of the enterprise to a user via the search engine.

* * * * *